United States Patent

Ludwig

[15] 3,689,723
[45] Sept. 5, 1972

[54] LINE CORD SWITCH

[72] Inventor: Louis Ludwig, c/o Eagle Electric Mfg. Co., Inc., 23-10 Bridge Plaza S., Long Island City, N.Y. 11101

[22] Filed: Dec. 11, 1970

[21] Appl. No.: 97,115

[52] U.S. Cl. ..................200/168 E, 200/166 CT
[51] Int. Cl. ...............................................H01h 9/02
[58] Field of Search ..................200/168 E, 166 CT

[56] References Cited

UNITED STATES PATENTS

| | | | |
|---|---|---|---|
| 2,802,083 | 8/1957 | Lapeyre | 200/168 E |
| 2,723,327 | 11/1955 | Gilbert | 200/168 E |
| 2,195,237 | 3/1940 | Bryant et al. | 200/166 CT X |
| 2,529,845 | 11/1950 | Lockwood | 200/168 E |
| 2,959,656 | 11/1960 | Bentsen | 200/168 E X |
| 2,738,482 | 3/1956 | Benander | 200/166 CT |

Primary Examiner—H. O. Jones
Attorney—Kirschstein, Kirschstein, Ottinger & Frank

[57] ABSTRACT

A line cord switch, the casing of which is subdivided by an insulating panel into two compartments. The line cord is in one compartment and the active switch elements including the actuating element and electrical contact elements are in the other compartment. The switch actuating element is of triangular shape and is rockably mounted within the switch compartment. Two of the apices of the switch actuating element are arranged to alternately project from opposite sides of the casing corresponding to either off or on position of the switch.

7 Claims, 10 Drawing Figures

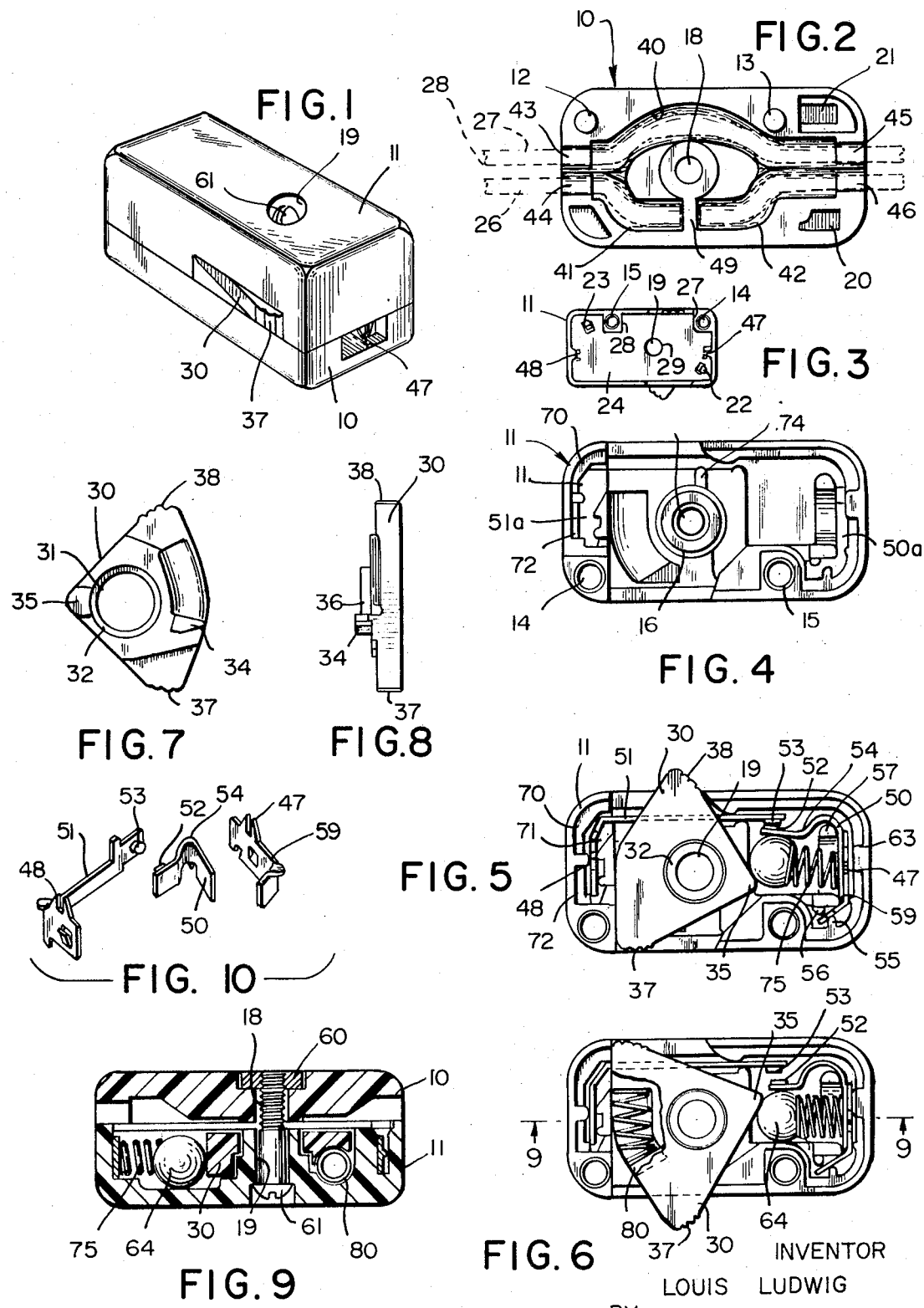

LINE CORD SWITCH

BACKGROUND OF THE INVENTION

1. Field of the Invention

A line cord switch which includes an insulating panel separating the line cord from the switch actuating element and the electrical contact elements and which provides a rockable action for the switch actuating element.

2. Description of the Prior Art

Line cord switches are a commonly used household item, basically being interposed in a twin wire electric line cord that runs from a double-pronged male plug to an electrical appliance. Most line cord switches are used with so-called "light-duty" electrical appliances which draw a small current in the order, for instance, of not more than 10 amperes and customarily less. Typical uses of line cord switches are in line cords for electric lighting fixtures. It is not usual to employ line cord switches of the character here under consideration in the line cords of heavy-duty appliances such, for instance, as electrical toasters, electrical blankets, electrical irons, electrical blenders, electrical mixers, electrical knife sharpeners, electrical can openers, electrical deicers, electrical heaters, electrical hot plates and the like, where the control switches as a matter of common usage are incorporated in the appliances themselves, if used at all. However, in electrical lighting fixtures it frequently is more convenient to turn power off and on by the use of a line cord switch than it is by means of a switch that is integrated with the lighting fixture. For example, in the case of electrical sconces, painting illuminating lamps, table lamps, floor lamps and bedside lamps, a line cord switch usually can be physically situated in a location where it is more convenient or accessible to a householder than the switch that is provided as a part of the lighting fixture itself. For this reason line cord switches have become very popular, particularly for after-market (in the home) installation.

Early line cord switches were rather bulky. Initially, some of these switches required cutting of both wires of the line cord, the stripping of all four ensuing ends and the connection of the stripped ends to four terminals inside the switch casing. This was improved upon by the cutting of only a single one of the two wires of a line cord, allowing one wire to pass uninterruptedly through the casing of the line cord switch and stripping insulation off the ends of the other cut wire which then were connected to two terminals within the casing. The switch mechanism itself, under the control of the user, either opened or closed an electrical path between the two terminals. This type of switch was essentially necessary with the older type of line cords which at the time usually comprised a pair of twisted conductors each having its own rubber sheathing and stranded jacket. Even with the advent of a single stranded jacket for both conductors it was still necessary to use line cord switches of the foregoing type, i.e. switches with terminals that required the wrapping of the stripped conductors therearound because it was not easy to determine in advance the exact positions of the twin conductors at any random point on such cord.

With the advent of the modern type of power line cord, i.e. one in which the two conductors were parallel and encased in a common sheathing of flexible insulation such as natural or synthetic rubber or synthetic plastic, the use of a simpler form of line cord switch became feasible, this being a switch which again required only one of the conductors to be cut and allowed the other conductor to remain intact within its insulating sheathing. The new type of line cord switch employed piercing points which upon mounting of the switch on the line cord became embedded in the strands of the cut conductor on opposite sides of the cut, the points being connected to two fixed contacts of the switch which were alternately bridged or disconnected by a rotating contact. A switch of this type is shown in U.S. Pat. No. 2,723,327.

However, such switches have several drawbacks. For example, the rotating contact can only be operationally turned in a single direction. This can be disconcerting because the user must always remember the proper direction. Moreover, depending on the tolerances and shapes provided in any given switch, the switch is sometimes susceptible, particularly after extended periods of use, to being reversely rotated. Such incorrect manipulation can render the switch inoperable. Moreover, these switches minimally constitute three separate electrical contacts including one fixed contact integral with one embedding point, a second fixed contact integral with a second embedding point and a third movable contact which can be positioned to either connect the first two contacts or to open the path between them.

A line cord switch is an item that is sold in very large quantities and is sold by competing firms under conditions of severe economic rivalry so that even a small difference in price can mean success or failure for any given switch design. That there are three electrical contacts entails a comparatively high cost of manufacture inasmuch as three separate parts must be blanked, formed and assembled. It would be highly advantageous if this number of contacts could be reduced without unduly sophisticating the shapes of the contacts or their assembly.

A further disadvantage of prior line cord switches, and this applies as well to other light-duty electrical devices, is that the line cord is in the same compartment as the other elements of which one or more is movable or conductive. The contiguity of the line cord and such other elements is conducive to failure of the line cord switch and other devices due, for example, to jamming of parts of the line cord against movable parts, to shredding or wearing of the line cord with consequent short-circuiting, and to inadvertent touching of the severed ends of one of the cord conductors with an electrical part from which it should be isolated, with ensuing short-circuiting. It would be highly advantageous if the line cord could be isolated from such other elements.

SUMMARY OF THE INVENTION

Purposes of the Invention

It is an object of the invention to provide a line cord switch which overcomes the foregoing disadvantages.

It is another object of the invention to provide a line cord switch which constitutes relatively few and simple parts, is inexpensive to manufacture and is rugged, reliable and highly durable in use.

It is another object of the invention to provide a line cord switch which has an irreduceable number of electrical contact elements, to wit, two, each of which includes a contact support, a piercing point, a shank and an insulating panel retaining tab.

It is another object of the invention to provide a line cord switch which has a unique actuating element including two operating segments, only one of which protrudes from the switch casing in a first switch state, the one segment moving into the switch casing when operated while the other segment proceeds to project from the switch casing as the switch is moved into its second state ready to be in turn operated to return the switch to its first state.

It is another object of the invention to provide a line cord switch which includes a rockable switch actuating element operable in the fashion of the just-preceding object.

It is another object of the invention to provide a line cord switch which includes a rockable switch element designed to incorporate the principle of U.S. Pat. No. 2,723,327.

It is ancillary object of the invention to provide a line cord switch which includes a rockable switch element modified to render the line cord switch momentary so that it will, upon release of an operated segment, return to a predetermined idle state.

It is another object of the invention to provide a line cord switch which includes an insulating panel separating the switch casing into two compartments one of which contains the line cord and the other of which contains the switch operating element and the electrical contact elements so that the two will not interfere with one another.

It is another object of the invention to provide an electrical device of the type including points adapted to be embedded in a line cord and in which electrical contact elements and actuating elements associated therewith are isolated by an insulating panel situated internally of the casing from a separate compartment that houses the line cord.

It is another object of the invention to provide a line cord switch or electrical devices such as described in either of the two foregoing objects wherein the electrical contact elements include piercing points extending through the insulating panel, and adapted to be embedded in the line cord and wherein the electrical parts also include tabs extending through the panel and bent over to engage the surface of the panel defining a wall of the line cord compartment.

Other objects of the invention will be apparent from the following description.

The invention accordingly consists in the features of construction, combination of elements and arrangement of parts which will be exemplified in the device hereinafter described and of which the scope of application will be indicated in the appended claims.

Brief Description of the Invention

The line cord switch of the present invention includes a two-part casing which is designed to be opened up to admit a line cord and then to be closed to render the switch electrically effective. Essentially, one casing-half houses the line cord, and the other casing-half houses the active switch elements. The interior of the casing is subdivided into two compartments by an insulating panel, the different compartments having the aforesaid functions. The compartments thus effectively isolate both wires of the line cord physically from the active switch elements.

The active switch elements basically comprise two electrically conductive elements each of which has line piercing points that protrude through the insulating panel to engage one wire of the line cord when the halves of the switch casings are forced together. Each conductive element further includes an electrical contact. Each of the conductive elements is electrically conductive between its piercing point and its electrical contact. Furthermore, each of the conductive elements includes integral therewith a tab which passes through an associated opening in the insulating panel or partition which engages the surface of the insulating panel in the line cord compartment so that the conductive elements and the insulating partition become effectively unitary, thus causing the conductive elements to anchor the partition in place and conversely causing the insulating partition to anchor the conductive elements in place. The casing-half that houses the conductive elements is formed with channels to receive one portion of each conductive element. Each of these portions has the piercing points and tabs unitary therewith, and acts as a fixed base. Furthermore, one of the switch conductive elements has a portion remote from the portion forming the fixed base which is also received in a channel in the casing-half so that it is also stationary. This latter portion carries a stationary contact. The other conductive element likewise is provided with a contact at the end remote from the portion forming its fixed base but this remote end is free to flex within the housing half in which it is located beneath the partition. In idle condition, the remote end bearing its contact, which is the movable contact, is spaced from the stationary contact.

A ball supported at the end of a coil spring provides a snap action for the movable contact; the same functioning as shown in U.S. Pat. No. 2,743,330. A switch actuating element is provided to rock the ball between its contact closed and its contact open position. The actuating element is of approximately deltoid configuration and mounted to rock about an axis perpendicular to the insulating partition with one apex thereof designed to swing between engagement of opposite sides of the ball. When the ball is in one position of the apex it forces the contacts together and in the other position of the apex, it permits the contacts to spring apart by virtue of the inherent opening bias of the switch conductive element that carries the movable contact. The other two apices of the deltoid movable switch element are so arranged that one or the other projects from one or the other of the sides of the switch casing. To operate the switch, i.e. to move the switch between either one of its two possible positions, to wit, open or closed, the user simply presses the projecting apex of the switch element causing the internal apex to shift to the opposite side of the ball. The projecting apices may be made easier to manipulate by roughening, ribbing or knurling the same. Inasmuch as all of the elements including the electrical contacts, the ball, the ball supporting spring and the deltoid actuating element are almost entirely disposed on the side of the insulating partition separating the two compartments of the casing, actuating the switch does not cause any of the movable elements to be hindered in such motion by interfering contact with the line cord.

In one form of the invention the line cord switch remains in either position in which it is placed, while in another form of the invention said switch functions as a momentary switch of the normally open single-pole, single-throw variety.

BRIEF DESCRIPTION OF THE DRAWINGS

In the accompanying drawings in which is shown one of the various possible embodiments of the invention:

FIG. 1 is a perspective view of a line cord switch constructed in accordance with an embodiment of the present invention;

FIG. 2 is an interior view of the switch casing-half that houses the line cord;

FIG. 3 is an interior view of the casing-half which houses the active switch elements, the partition being illustrated in a position covering said element;

FIG. 4 is a top interior view of the switch casing-half that houses the active switch elements;

FIG. 5 is a top view similar to FIG. 4 but showing the active switch elements in place;

FIG. 6 is a view similar to FIG. 5 but illustrating a modified form of the invention in which a return spring is employed to render the switch momentary;

FIG. 7 is a bottom view of the side of the movable switch actuating element; a view opposite to that illustrated in FIG. 5;

FIG. 8 is an end view of the movable switch actuating element taken from the right-hand side of FIG. 7;

FIG. 9 is a sectional view taken substantially along the line 9—9 of FIG. 6; and FIG. 10 is a perspective view of the conductive elements.

DESCRIPTION OF THE PREFERRED EMBODIMENTS

Referring to the drawings, the line cord switch comprises a first housing portion or casing 10, shown in FIGS. 1 and 2 and a second housing portion or casing 11 shown in FIGS. 1 and 3 through 5. The two casings 10 and 11 are formed of insulating material, preferably by molding. The two casings 10 and 11 mate with each other in one relative position as illustrated in FIG. 1. The casing 10 has one projecting locating post 12 which mates with a cylindrical opening 14 of the casing 11, and a second locating post 13 which mates with a cylindrical opening 15 of the housing portion or casing 11. Upon assembly of the casings 10 and 11, the locating posts 12 and 13 seat in the respective openings 14 and 15 and insure that the two housing portions can only be assembled in the one particular alignment.

The two casings 10 and 11, which are aligned by means of the locating posts 12 and 13, are affixed to each other by means of a screw 61 in FIGS. 1 and 9 which fits through an opening 19 of casing 11 and an opening 18 of casing 10 to mate with a nut 60. The nut 60 may be forced into or affixed to the casing 10. With the screw 61 mated with the nut 60, and with locating posts 12 and 13 seated in openings 14 and 15 an effectively unitary and rugged structure results.

As shown particularly in FIG. 2 the casing 10 has a curved conductor receiving channel 40 extending longitudinally from an abutting or raised end 43 at the left of FIG. 2 to an abutting or raised end 45 at the right of the casing 10. The channel 40 is designed to receive one wire or conductor 27 of a conventional conductor line cord 28 utilized for light fixtures and the like. The line cord 28 is shown by dotted lines in FIG. 2. The raised ends 43 and 45 function, when the casings 10 and 11 are assembled about the line cord 28, to grip or squeeze the conductor 27 of the line cord 28 at each end of the casing 10 against the casing 11. Similarly, raised ends 44 and 46 at the respective ends of two separated by aligned channels 41 and 42, function to grip the conductor 26 of the line cord 28.

As seen in FIG. 2, the conductor 26 of the line cord 28 is severed, with the severed parts of the conductor 26 respectively positioned in channels 41 and 42 of the casing 10, at either side of a transverse partition 49. The partition 49 is raised relative to the channels 41 and 42 and thereby serves to insulate the ends of the conductor 26 from direct electrical contact with one another. In order to place the conductor 28 into the casing 10, it is only necessary to separate the two conductors 26 and 27 from each other and then to sever conductor 26. It is not necessary to remove a length of the conductor 26 or to strip away the insulating covering of either conductor 27 or 26. The two severed portions of the conductor 26 can be readily separated by the small distance represented by the partition 49. If desired, a short length of conductor 26 can be cut away of a length slightly longer or equal to the longitudinal dimension of the partition 49.

The channels 40, 41 and 42 of the housing portion or casing 10 are enclosed by an insulator panel or partition 24 shown particularly in FIG. 3. When the line cord switch is assembled, the partition 24 separates the two casings 10 and 11 forming two substantially isolated compartments: one enclosing the line cord 28 and the other enclosing two conductive elements 50 and 51 shown in FIGS. 5 and 9 and a deltoid or triangularly shaped switch element 30. The two conductive elements 50 and 51 are shown more particularly in the perspective views of FIG. 10. The conductive element 50 consists of two elements 54 and 59 which may be attached to each other or are wedged together when inserted in the channel 50a in the compartment joined by the casing 11 and the partition 24. The elements 54 and 59 form a functionally unitary structure. All the active switch elements including the elements 50, 51, and 30 are enclosed in the compartment formed by the casing 11 and the insulation partition 24. The partition 24 may be formed of any insulating material such as fiber board.

Protruding through the partition 24 are two tabs 22 and 23 (see FIG. 3) which are integral parts respectively of the conductive elements 50 and 51. The tabs 22 and 23 are bent over to engage the partition 24 to hold it firmly in place against the casing 11, to form an effectively unitary construction. The partition 24 also has a hole 29 through which the screw 61, described above in reference to FIG. 9, passes to engage the nut 60. The only other elements which pass through or around the partition 24 are the line piercing points 47 and 48 shown in FIGS. 1 and 10. These points 47 and 48 are at the opposite ends of the casing 11 when the casings 10 and 11 are assembled. The line piercing points 47 and 48 are respectively integral with and form a part of the conductive elements 50 and 51. The point 47 is part of the element 59 which with the element 54 forms the conductive element 50. Each of the tines 47 and 48 has two spaced points which engage the conductor 26 when the two casings 10 and 11 are mated. The points 47 and 48 pierce the insulating material of the electrical conductor 26 to make firm electrical contacts on opposite sides of the insulating partition 49.

As described above, the points 47 and 48 are respectively integral parts of the two conductive elements 50 and 51. The line cord switch includes only the two conductive elements 50 and 51 and no other conductive elements as the deltoid rocking switch element 30 depicted particularly in FIGS. 5, 7, and 8 is made of insulating material such as plastic.

The conductive elements 50 and 51 are each affixed respectively in channels 50a and 51a, shown particularly in FIG. 4, formed in the casing 11. The conductive element 51 does not include any movable parts though it may be resilient. The element 51 has an electrical contact 53 at one end which, as shown in FIG. 5, may be in contact with an electrical contact 52 at the end of the conductive element 50. The electrical contact 52 is affixed at the end of a resilient and movable portion 54 which is part of one of the two elements shown in FIG. 10 which together form the conductive element 50. The other element 59 of the conductive element 50 is fitted between two tabs 55 and 56 which form part of the housing casing 11 and hold the conductive element 50 in place. The portion 54 of the conductive element 50 may be resilient and the portion 59 need not be resilient. The conductive element 50 includes the piercing points 47 and the tab 22, both described above, which fit through openings or indentations in the insulator panel 24. The conductive element 50 is also held in place by means of a raised member 57. When the insulator panel or partition 24 is in position on the casing 11 with the tabs 22 and 23 engaging and forcing it against the housing casing 11, the partition 24 also assists in forcing the conductive element 50 in its position held by the tabs 55 and 56 and the member 57. Similarly, the conductive element 51 is held in place by raised members 70, 71, and 72 shown in FIGS. 4 and 5 at one end and by means of a tab 74, shown in FIG. 4, which holds the conductive element 51 in position. These elements 70, 71, 72, and 74 are all integral parts of the housing casing 11.

As shown in FIG. 5, the two contacts 52 and 53 are engaged so that an electrical circuit is completed between the two piercing points 47 and 48 to bridge the gap at the separating partition 49 shown in FIG. 2 between the severed portions of the conductor 26. The portion 54 of the conductive member 50 is flexed to position its contact 52 in electrical contact with the relatively stationary contact 53 by means of a ball 64 which is positioned against and seated in the end coil of a coil spring 75. The ball 64 is moved to one of two positions by means of the deltoid rotatable actuating member 30. The actuating member 30 has an apex 35 which engages ball 64 and forces it to compress the spring 75. FIG. 6, which depicts an embodiment of the invention wherein the contacts 53 and 52 are restored automatically to their separated positions, shows the ball 64 at its normal or contact separating position. The apex 35 slides on the periphery of the ball 64 snapping it from the open contact to the closed contact position, and vice versa. The actuating member 30 has one or the other of two knurled apices 37 or 38 protruding from the housing casing 11. As shown in FIG. 5, the knurled apex 37 has been pressed to enter the housing casing 11, rotating the apex 38 to extend from the casing 11. The rotating motion of the deltoid actuating member 30 is limited by a protruding portion 34 which engages the housing casing 11 at opposite ends of its rotating motion. The deltoid actuating member 30 has an opening 31 which fits over a raised cylindrical support 32. The support 32 forms the opening 19 described above through which the screw 61 passes.

In the operation of the switch, when the parts are in the position as shown in FIG. 5, the circuit is closed with the ball 64 being in an upper position wedged between the apex or cam-end 35 of the actuating member 30 and the end of the conductive element 50 at the contact 52. With the ball 64 wedged in this manner in its upper position the circuit through the conductive members 50 and 51 which bridges the circuit gap at the partition 49 is closed. When the knurled apex 38 is pressed, the ball 64 is forced against the spring 75, and as the apex 35 passes a central position along a longitudinal axis of the switch, the compressed spring 75 snaps the ball 64 to its lower position away from the conductive element 50 and its contact 52. The circuit through the conductive element 50 and 51 is accordingly opened when the ball 64 is in its lower position.

The snap action motion permits actuation of the switch with very little effort or pressure on the actuating member 30. Though a digit touch is required for actuation, the switch remains firmly held in its on or circuit closed position, or in its off or circuit opened position. The snap action of the ball 64 relative to the conductive member 50 provides for a rapid and positive make or break which minimizes arcing.

The deltoid actuating member 30 and the two conductive elements 50 and 51 as well as the ball 64 and the spring 75 are all located in the housing compartment formed between the casing 11 and the insulator partition 24. The only break in the complete partitioning or separation of the compartments in the housing casings 10 and 11 by the insulator partition 24 is the openings for the two tabs 22 and 23, the indentations for the piercing points 47 and 48 at opposite ends of the body casing 11, and the opening 29 in the insulator partition 24 which is aligned with the openings 18 and 19, respectively, of the housing casings 10 and 11. The insulator partition 24, accordingly, completely separates all the active and movable parts of the electric cord switch from the line cord 28.

The embodiment shown in FIGS. 6 and 9 is similar to that described above in reference to FIGS. 1–5, except that a restoring spring 80 is utilized for returning the deltoid actuating member 30 to its normal position as shown in FIG. 6. Similar numerical designations are utilized in FIGS. 6 and 9 for corresponding components of FIGS. 1–5. When the knurled apex 37 is pressed to rotate the actuating member 30, the ball 64 is moved by the apex 35 to engage the contact 52 against the contact 53. When operating pressure is removed from the actuating member 30, the compressed spring 80 returns the member 30 to its original, or open circuit position as shown in FIG. 6.

It thus will be seen that there is provided a device which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. An electric switch for a twin wire line cord, said switch comprising:
    a. a first hollow housing having one open side,
    b. a second hollow housing having one open side,
    c. said housings being in opposed registered abutment with their open sides facing each other so as to jointly constitute a casing,
    d. a panel of insulating material physically distinct from said housings, said panel being disposed between said housings and located within the casing so as to form in conjunction with the hollow of each housing a different internal compartment,
    e. means within one housing providing two channels for receiving a twin wire line cord,
        i. one of said channels being continuous to accommodate one unbroken wire of the twin wire line cord,
        ii. the other of said channels being discontinuous,
        iii. the other wire of said twin wire line cord having a cut therein,
        iv. the other channel accommodating the other wire with the cut ends thereof in different segments of the discontinuous other channel,
    f. movable and stationary switch members for opening and closing the circuit between cut ends of the other wire of the twin wire line cord,
    g. said members being located in and enclosed by the compartment of the other housing,
    h. means within said other housing to hold said members in operable position,
    i. said insulating pannel having two openings therein each adjacent a different segment of the discontinuous channel,
    j. each of said members having a piercing point extending through a different one of said openings to be embedded in a different one of the cut ends of the other wire to electrically connect said cut ends when the movable and stationary switch members are in engagement.

2. An electric switch in accordance with claim 1 wherein there is included manually manipulatable actuating means for selectively moving said movable switch member into and out of electrical engagement with the stationary member.

3. An electric switch in accordance with claim 1 wherein the panel includes two additional openings and wherein each switch member has an integral part thereof a tab, said tabs extending through the additional openings and engaging the panel to secure said members to said panel.

4. An electric switch in accordance with claim 2 wherein the actuating means constitutes an actuating member and mean for mounting the actuating member for oscillation between two positions in the other housing, said actuating member having two surfaces shaped and constructed to be selectively pressed by a finger of a user for operating the electrical switch, one of said surfaces being retracted into the other housing and the other of said surfaces protruding from said other housing in a first position of the actuating member and such positions being reversed in a second position of the actuating member.

5. An electric switch in accordance with claim 2 wherein the movable switch member has a resilient portion normally biasing a contact associated therewith into a position spaced from a contact associated with the stationary switch member, and wherein the actuating member is electrically non-conductive and movable between two positions in one of which it flexes the contact of the movable switch member into electrical and physical engagement with the contact of the stationary switch member and in the other of which it permits the movable switch member to move its contact away from the contact of the stationary switch member.

6. An electric switch in accordance with claim 4 wherein the other hollow housing is formed with openings to permit one or the other of said surfaces to extend beyond said other housing depending upon the position of the actuating member.

7. An electric switch in accordance with claim 6 wherein said actuating member is of a deltoid configuration having three apices, one of said apices protruding through one of said openings in one position of the actuating member and the other of said apices protruding through the other opening in the second position of said actuating member, said switch including resilient means responsive to the position of the third of said apices for selectively moving the movable switch member into and out of electrical physical engagement with the stationary switch member.

* * * * *